May 15, 1962     A. H. EDSTROM     3,034,323
ZERO BACKLASH COUPLING
Filed July 25, 1961

INVENTOR:
ANDREW H. EDSTROM
BY
ATTORNEYS

United States Patent Office 3,034,323
Patented May 15, 1962

3,034,323
ZERO BACKLASH COUPLING
Andrew H. Edstrom, East Palo Alto, Calif., assignor to American Radiator & Standard Sanitary Corporation, New York, N.Y., a corporation of Delaware
Filed July 25, 1961, Ser. No. 126,669
4 Claims. (Cl. 64—31)

This invention relates to and in general has for its object the provision of a coupling for transmitting power from a first shaft to a second shaft which may not be exactly aligned with said first shaft.

Although various couplings exist for transmitting power from one shaft to another, they are all subject to one objection or another. Well-known examples of such couplings are the Brotherhood flexible coupling, Alley's flexible coupling, Hopkinson's flexible coupling, Oldham's coupling, leather-plate couplings and leather bolt flexible couplings.

More specifically, one of the objects of this invention is the provision of a flexible coupling including generally coaxial drive and driven discs, a linking disc disposed between said drive and driven discs, first means for pivoting said linking disc to the drive disc on a first pivot axis and second means for pivoting said linking disc to said driven disc on a second pivot axis angularly spaced from said first pivot axis less than 180°, and wherein said first and second means are equally spaced from the axis of the linking disc.

Another object of this invention is the provision of a coupling of the character above described wherein the means for pivoting the linking disc to the drive and driven discs includes a first crank pin carried by the drive disc and accommodated in a hole formed in the linking disc and a second crank pin carried by the driven disc accommodated in a second hole formed in the linking disc.

Still another object of this invention is the provision of a coupling of the character above described wherein the axis of the linking disc and the axes of the two crank pins are formed on an equilateral triangle.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings.

Figure 1:
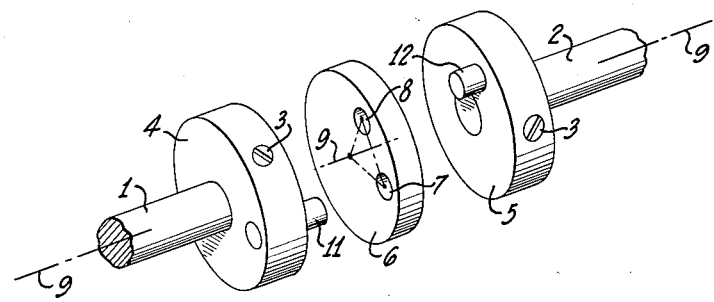
FIG. 1 is an isometric exploded view of a coupling embodying the objects of my invention.
Figure 2:
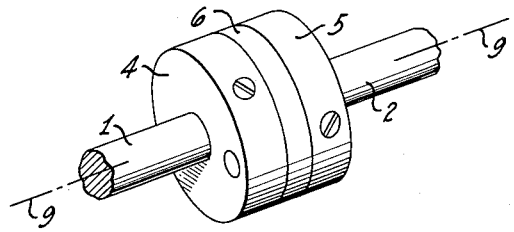
FIG. 2 is an isometric view of the coupling shown in FIG. 1.

As illustrated in these two figures, the objects of my invention have been embodied in a flexible coupling including a drive shaft 1 and a driven shaft 2 arranged to be journaled generally coaxially with each other in bearings not shown. Secured to the free end of the drive shaft 1 coaxially therewith, and by a set screw 3, is a drive disc 4.

Similarly, a driven disc 5 is coaxially secured to the free end of the driven shaft 2 by a set screw 3.

Disposed between the opposed faces of the drive disc 4 and the driven disc 5, generally coaxially therewith, is a linking disc 6 provided adjacent its periphery with first and second angularly spaced, longitudinally extending bores 7 and 8. The bores 7 and 8 are equally spaced from the axis 9 of the linking disc 6, and preferably this axis and the axes of the bores 7 and 8 are formed on an equilateral triangle. In other words, the distance between the axes of the bores 7 and 8 is preferably equal to the distance between the axis 9 of the linking disc 6 and the axis of either of the bores 7 or 8.

Extending outwardly from the outer face of the drive disc 4 is a crank pin 11 journaled in the bore 7. Similarly a crank pin 12, extending outwardly from the outer face of the driven disc 5, is journaled in the bore 8.

Obviously the crank pins 11 and 12 can be fixed to the linking disc 6 rather than to the drive and driven discs 4 and 5, and in that event the crank pins would be journaled in bores formed in the drive and driven discs 4 and 5. This would merely constitute a reversal of the elements involved.

Although the materials from which the component parts of the coupling above described are made are not critical, conveniently the linking disc 6 can be made of nylon, and the drive and driven discs of either metal or plastic.

As a result of the construction above described, rotation of the drive disc 4 by the drive shaft 1 is transmitted to the driven shaft 2 through the action of the crank pin on the linking disc 6, the action of the disc 6 on the crank pin 12 and through the action of the driven disc 5 and the driven shaft 2. A coupling such as this allows for fairly wide shaft eccentricities with zero backlash, this action being made possible by the angular displacement of the linking disc 6 during each revolution. Also, during each revolution the driven disc 5 experiences a cyclic acceleration and deceleration, the net product of which is unity with the driving disc 4.

The angle between the two crank pins 11 and 12 determines the velocity change behavior of the driven disc 5 as well as the side loads between the components of the coupling. An equilateral disposition of the axis 9 of the linking disc and the axes of the bores 7 and 8 is preferable for the reason that this permits the widest "off-center" shaft operation.

Also, it should here be noted that no backlash occurs; first, for the reason that no play exists between the crank pins 11 and 12 and the bores 7 and 8 in which they are journaled, and secondly for the reason that the linking disc 6 is pivoted to the drive disc 4 at only one point and to the driven disc 5 at only one point. If, contrary to this, the linking disc were to be connected to each of the other discs by two pins, the mating holes in the linking disc would have to be oversize so as to allow the driving pins to wander about in their orbits, alternately contacting the linking disc and coasting during the rotation of the coupling. As an alternative to having a lost-motion connection between the pins and their mating holes, the linking disc would have to be extremely flexible. With the single pin or crank coupling of the present invention, each pin is always in driving contact with the linking disc and consequently a continuous transmission of power occurs through the components of the coupling and eccentricity between the two shafts being taken up by the cyclic advance and retardation of the driven disc 5.

Furthermore, the coupling here described is extremely simple to manufacture, and consequently can be sold at a low price.

I claim:

1. A coupling for coupling first and second generally aligned shafts comprising: a drive disc arranged to be coaxially mounted on said first shaft; a driven disc arranged to be coaxially mounted on said second shaft; a linking disc disposed between said drive and driven discs generally coaxial therewith; first pivot means disposed between said linking disc and said drive disc for pivoting said drive disc to said linking disc on a first pivot axis; and second pivot means disposed between said linking disc and said driven disc for pivoting said linking disc to said driven disc on a second pivot axis angularly spaced from said first pivot axis less than 180°; the radial distance between said first pivot axis and the axis of said linking disc being substantially equal to the radial distance between said second pivot axis and the axis of said linking disc.

2. A coupling of the character set forth in claim 1 wherein the distance between said first and second pivot axes is equal to the radial distance between the axis of said linking disc and said first pivot axis.

3. A coupling of the character set forth in claim 1 wherein said first and second pivot means includes a pair of spaced axially extending holes formed in said linking disc; a first crank pin extending outwardly from said drive disc and snugly accommodated in one of said holes, and a second crank pin extending outwardly from said driven disc and snugly accommodated in the other of said holes.

4. A coupling of the character set forth in claim 1 including a drive shaft secured to said drive disc coaxially therewith, and a driven shaft secured to said driven disc coaxially therewith.

References Cited in the file of this patent

UNITED STATES PATENTS

| | | |
|---|---|---|
| 1,936,573 | Anger | Nov. 28, 1933 |
| 2,343,244 | Rose | Mar. 7, 1944 |
| 2,387,705 | Oliver | Oct. 23, 1945 |